Oct. 8, 1957
W. D. CURTIS
2,809,066
QUICK ACTING CLAMP MEANS FOR HANDLE STRUCTURES OF
FLASKS OF THE VACUUM COFFEE-MAKING
AND SIMILAR TYPES
Filed Aug. 30, 1952
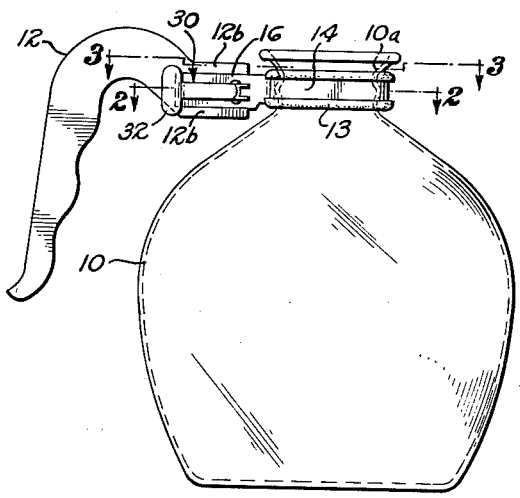
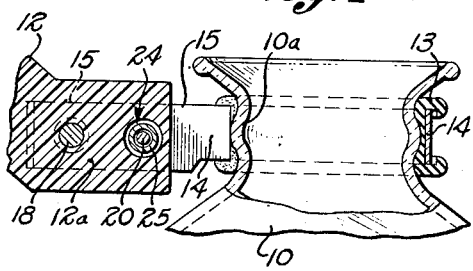
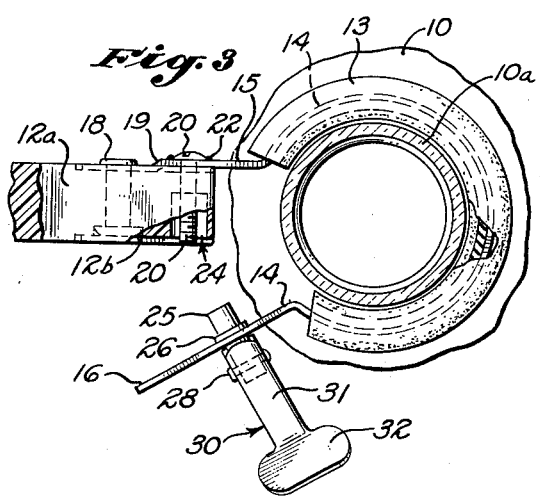
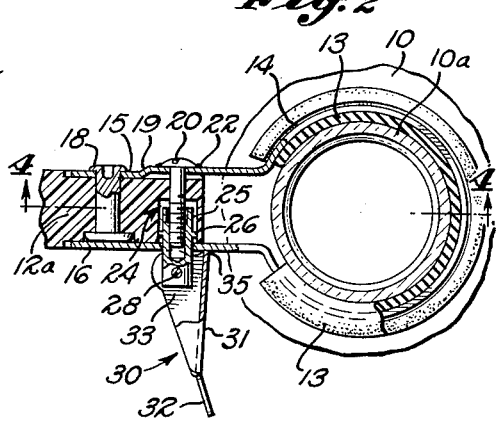
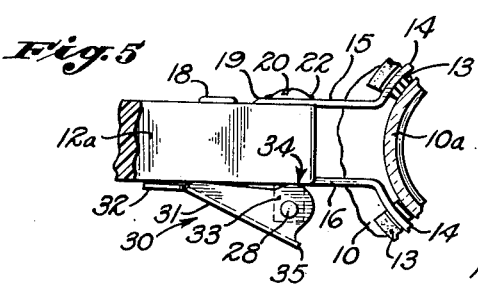
INVENTOR:
WILBUR D. CURTIS
BY HIS ATTORNEYS
HARRIS, KIECH, FOSTER & HARRIS
By Irving F. Kiech

United States Patent Office 2,809,066
Patented Oct. 8, 1957

2,809,066

QUICK ACTING CLAMP MEANS FOR HANDLE STRUCTURES OF FLASKS OF THE VACUUM COFFEE-MAKING AND SIMILAR TYPES

Wilbur D. Curtis, Studio City, Calif., assignor to Wilbur Curtis Company, Inc., Los Angeles, Calif., a corporation of California Application August 30, 1952, Serial No. 307,317

2 Claims. (Cl. 294—31.2)

This invention relates to detachable handle structures used on the necks of glass flasks such as are commonly employed in the making of coffee in comparatively small quantities by the conventional vacuum system and for dispensing similar relatively small quantities of brewed coffee.

A particular object of this invention is to provide clamping means for the quick attachment and removal of handles from glass flasks of the indicated type.

It is currently very common to brew and dispense coffee by means of bowl-shaped glass flasks which are capable of holding only eight or ten cupfuls of brewed coffee. Since the life of handles and clamps used on such flasks is much longer than that of the flasks themselves, it is desirable to provide means for the ready detachment of a handle and its clamp from a broken flask and for ready attachment of such handle and clamp to a new flask. Also, since such attachment and detachment of handles are commonly performed by waitresses under the stress of serving food in eating establishments and coffee shops, it is evident that means which will facilitate the removal of a handle from a broken flask and its attachment to a fresh flask offers considerable advantage. The value of such advantages is enhanced by reason of the fact that in many instances the vessels being handled are hot, and as a consequence quick acting means tend to avoid a waitress' becoming burned during manipulation of the parts.

It is, therefore, an incidental object to provide handle attachment means for coffee flasks which are so simple in operation that they may be easily applied and easily removed, even with hot apparatus, and without any discomfort or delay.

Another object of the invention is to employ in such a structure relatively simple attachment means and in conjunction therewith relatively simple clamping means to secure the parts in adequately rigid operative relationship.

Other objects of the invention and the various features of construction thereof will become apparent to those skilled in this art upon reference to the following specification and the accompanying drawing in which one embodiment of the invention is illustrated.

In the drawing:

Fig. 1 is a side elevation of a conventional glass coffee flask to the neck of which is attached a conventional handle by means of a quickly acting fastening structure in accordance with this invention;

Fig. 2 is a fragmentary cross section taken on the line 2—2 of Fig. 1;

Fig. 3 is a fragmentary view showing the fastening and clamping means of this invention in top plan, as indicated by the line 3—3 of Fig. 1;

Fig. 4 is a vertical sectional detail taken on the line 4—4 of Fig. 2; and

Fig. 5 is a fragmentary view, similar to that of Fig. 3, showing in plan the attachment mechanism in clamping position.

The drawing shows a more or less conventional glass bowl or flask 10 to whose restricted neck 10a there is attached a common form of handle 12 through the medium of a flanged split rubber cushioning ring 13 whose flanges engage over the upper and lower edges of a spring metal retaining and clamping band 14. As seen in Fig. 3, the inner, upper portion of the handle 12, which is indicated at 12a, is flanged at its opposite sides to provide upper and lower horizontally extending flanges 12b between which there is received, on one side, one integral end 15 of the spring clamp band 14, and between which flanges 12b on the other side of the handle end 12a there is received the other flat end 16 of the spring metal clamp band 14.

The end 15 of the clamp band 14 is rigidly secured between the corresponding handle flanges 12b by a rivet 18 whose outer end may be flanged over as indicated, and whose inner end has its head imbedded in the composition of which the handle 12 is formed. For the purpose of providing for limited tensioning movement of an intermediate portion of the end 15 of the clamp band 14, such intermediate portion of the end 15 is offset outward as indicated at 19 especially in Figs. 2, 3, and 5.

The offset portion of the end 15 of the clamp band 14 carries a screw 20. Preferably the head of the screw 20 is anchored in the offset portion of the end 15 of the band 14 as by brazing or welding as indicated at 22. This insures retention of the screw 20 in proper position for cooperation with means for binding the swinging end 16 of the spring clamp band 14 in position against the respective side of the flat portion 12a of the handle 12, as seen in Fig. 2. In the particular form shown, the threaded portion of the screw 20 occupies a well 24 provided in the mentioned handle portion 12a, and this well receives an internally threaded ferrule or sleeve 25 which serves as a nut and is rotatably mounted in a circular opening in the end 16 of the band 14 so that the outer end of the sleeve 25 is exposed at the outer face of the band end 16. To prevent passage of the sleeve 25 entirely through the band end 16, it is provided with an integral collar 26 (Figs. 2 and 3) adapted to bear against the inner face of the band end 16 and to be received in the well 24 when the parts are in the clamping position of Fig. 2.

To effect the required binding or clamping action, the outer end of the sleeve 25 is provided with a hinge pin or pintle 28 on which is pivotally mounted a clamping cam lever generally indicated at 30 which includes a shank 31 having at its swinging end a finger piece 32 and having its sides in the form of integral ears 33 whose inner portions receive and are pivoted upon the ends of the pintle 28.

As indicated in Fig. 2, the cam lever 30, through the pintle 28, is adapted to be used as a manually operable head on the outer end of the screw sleeve 25 for the purpose of turning the sleeve 25 onto the threaded portion of the screw 20 to bring the inner, rearward portions of the ears 33 into engagement with the outer face of the band end 16. Such portion of each ear 33 is formed with an eccentric cam curve indicated at 34 in Fig. 5. When the parts have been screwed down into approximately the positions shown in Fig. 2, the finger piece 32 is grasped and the cam lever 30 is swung into the final clamping position shown in Fig. 5. When in this position, the heel of the cam curve 34 will have moved past dead center so that the cam lever 30 is held down in the locked position of Fig. 5. In order to insure that the cam lever 30 assumes an outwardly extending position, as seen in Fig. 2, so that it may be readily grasped for rotation to turn the screw sleeve 25 down on the screw 20 (or to unscrew such sleeve), the rearward end of the shank 31 is extended somewhat to provide a stop 35 adapted to bear against the band end 16, as illustrated in Fig. 2, when the cam lever 30 is swung to open position.

The inherent resilience in the main loop of the clamp band 14 acts to hold the swinging band end 16 in an open position such as illustrated in Fig. 3 and also permits such band end 16 to be swung out far enough so that the entire handle structure may be removed from the neck of the flask 10. When the swinging band end 16 has been moved from the position of Fig. 3 inward toward the position of Fig. 2 and the screw sleeve 25 has been turned down on the screw 20 to the position of Fig. 2, the main loop of the clamp band 14 provides tensioning resilience permitting the swinging of the cam lever 30 from the position of Fig. 2 to the position of Fig. 5 and the described action of the cam curves 34. Such additional resilience and lost motion as may be required to complete the cam action as the cam lever 30 is moved to the locked position of Fig. 5 is provided by the described offsetting at 19 of the inner portion of the fixed end 15 of the clamp band.

From the foregoing it will be apparent that the sleeve screw 25, which is received in the well 24 when screwed into operative position on the screw 20, is retained against dislodgement from the band end 16 when the parts are moved to the open position of Fig. 3, by reason of the retention collar 26 on the inner portion of the sleeve screw 25 and by reason of the attachment of the cam lever 30 to the outer portion of the screw sleeve 25. It is also apparent from the foregoing that, when the parts are moved into an open position such as illustrated in Fig. 3, the entire handle structure may be removed from the neck of the flask 10 and that it may be readily replaced on a new flask by moving the parts successively through the positions of Figs. 3, 2, and 5, the manipulation of the parts and the mounting and demounting of the screw sleeve 25 being readily effected as described.

In view of the fact that variations other than the specific form illustrated may become apparent to those skilled in the art, it is intended to protect all forms falling within the scope of the patent claims.

I claim as my invention:

1. In a quickly detachable handle structure for coffee flasks and the like: a handle member; a clamp band to engage around a neck of a flask and having one end secured to a portion of said handle member; a first screw means fixed to said one end of said band adjacent said portion of said handle member separately from the other end of said band and having an engageable threaded portion; a second screw means rotatably mounted in the other end of said band and movable with said other end between an open position and a closed position of engagement with said first screw means and adjacent said portion of said handle member; retaining means on said second screw means at the inner side of said other end of said band to retain said second screw means on said other end of said band at all times whereby to move with said other end between said open and closed positions; and exposed actuating means mounted on said second screw means for detachably connecting said second screw means to said first screw means and thereby binding said ends of said band against said handle member and in fixed relation to each other, said actuating means including cam lever means movably mounted on an outer end portion of said second screw means and in engagement with said other end of said band for rotating said second screw means and also clamping said band in place, such movable mounting including a pivot pin extending through said lever means and said outer end portion for rotation of said second screw means through said pivot pin, said retaining means on said second screw means further including collar means on the inside of said other end of said band to retain said lever means and said second screw means on such other end of said band and spaced to provide lost motion in such other end of such band permitting clamping action by said cam lever means, said one end of said band having a portion offset from said handle member and such offset portion carrying said first screw means whereby such offset portion may yield under influence of said cam lever means and said screw means to tension said clamp band.

2. In a quickly detachable structure for handle mountings for coffee flasks and the like: a handle member having a well extending transversely in its inner end portion and open at one side thereof; a clamp band to engage around a flask neck and having one end secured to said handle member; a screw secured on said one end of said band and having a threaded portion disposed in said well in said handle member; a screw sleeve rotatably mounted on the other end of said clamp band and adapted to be screwed on said threaded portion of said screw and enter and work in said well to secure said clamp band upon said flask neck; retaining means on said screw sleeve at the inner side of said other end of said band for retaining said screw sleeve on said other end of said band at all times whereby to move with said other end of said band, said retaining means being disposed at the outer end of said well when the parts are in operative position; and exposed manipulating means carried on an outer portion of said screw sleeve for detachably connecting said screw sleeve with said screw and detachably retaining said clamp band on said flask neck, said manipulating means being a cam lever pivoted on said outer portion of said screw sleeve to rotate said sleeve on said screw, said cam lever bearing upon the outer face of said other end of said clamp band to bind the latter in operative position through the agency of said screw and screw sleeve, said retaining means on said screw sleeve providing for lost motion of said sleeve by axial movement thereof in said other end of said clamp band, said one end of said band having an outwardly offset portion disposed at the end of said handle member adjacent said flask neck receiving said band, said offset portion carrying said screw whereby such offset portion yields under influence of said cam lever and screw sleeve means to tension said clamp band.

References Cited in the file of this patent

UNITED STATES PATENTS

| | | |
|---|---|---|
| 546,903 | Ryan | Sept. 24, 1895 |
| 2,137,884 | Weeks | Nov. 22, 1938 |
| 2,307,145 | Mattoon | Jan. 5, 1943 |
| 2,378,867 | Reichart | June 19, 1945 |
| 2,422,510 | Ward | June 17, 1947 |
| 2,430,677 | Hobart | Nov. 11, 1947 |
| 2,495,688 | Blakeslee | Jan. 31, 1950 |
| 2,605,010 | Sieling | July 29, 1952 |

FOREIGN PATENTS

| | | |
|---|---|---|
| 21,838 | Great Britain | Oct. 2, 1896 |
| 556,795 | Great Britain | Oct. 21, 1943 |